US006897749B2

(12) United States Patent
Jonsson et al.

(10) Patent No.: US 6,897,749 B2
(45) Date of Patent: May 24, 2005

(54) MAGNETIC ENERGY STORAGE DEVICE

(75) Inventors: Tomas Jonsson, Uppsala (SE); Karin Thorburn, Linkoping (SE); Udo Fromm, Stuttgart (DE); Peter Hessling, Vasteras (SE); Arne Gustafsson, Vasteras (SE); Christian Sasse, Stafford (GB); Pan Min, Uppsala (SE); Mikael Dahlgren, Vasteras (SE)

(73) Assignee: ABB AB, Vasteras (SE)

( * ) Notice: Subject to any disclaimer, the term of this patent is extended or adjusted under 35 U.S.C. 154(b) by 70 days.

(21) Appl. No.: 10/296,237
(22) PCT Filed: Jun. 4, 2001
(86) PCT No.: PCT/EP01/06870
§ 371 (c)(1),
(2), (4) Date: Aug. 25, 2003
(87) PCT Pub. No.: WO01/95458
PCT Pub. Date: Dec. 13, 2001

(65) Prior Publication Data
US 2004/0114403 A1 Jun. 17, 2004

(30) Foreign Application Priority Data
Jun. 7, 2000 (GB) .............................................. 0013929

(51) Int. Cl.$^7$ ............................................... H01F 6/00
(52) U.S. Cl. ....................... 335/216; 361/141; 505/211; 505/213; 505/700; 505/869; 505/879
(58) Field of Search .......................... 505/211–213, 700, 505/705, 851, 869, 879; 361/19, 141; 335/216

(56) References Cited

U.S. PATENT DOCUMENTS

| 4,939,444 | A |   | 7/1990  | Cacheux   |             |
|-----------|---|---|---------|-----------|-------------|
| 5,289,150 | A | * | 2/1994  | Rabinowitz | ......... 335/216 |
| 5,523,914 | A | * | 6/1996  | Weck et al. | ......... 361/141 |
| 5,682,304 | A |   | 10/1997 | Shteynberg |             |

* cited by examiner

Primary Examiner—Ramon M. Barrera
(74) Attorney, Agent, or Firm—Oblon, Spivak, McClelland, Maier & Neustadt, P.C.

(57) ABSTRACT

A superconducting magnetic energy storage (SMES) device including a first coil made of superconducting material, a cooling mechanism for cooling the first coil to superconducting temperatures, a second coil inductively coupled to the first coil for inputting emergy to, and/or outputting energy from, the first coil, and a switch for switching the first coil between a superconducting condition and a non-superconducting condition. The first coil is arranged as a closed loop electric circuit having no connecting device mechanically connected to it for inputting or outputting energy. The switch includes a third coil for the application or removal of a magnetic field for switching the first coil between its non-superconducting and superconducting conditions. A method inputs energy to and/or outputs energy from the first coil and a power supply system utilizes the device and method.

23 Claims, 3 Drawing Sheets

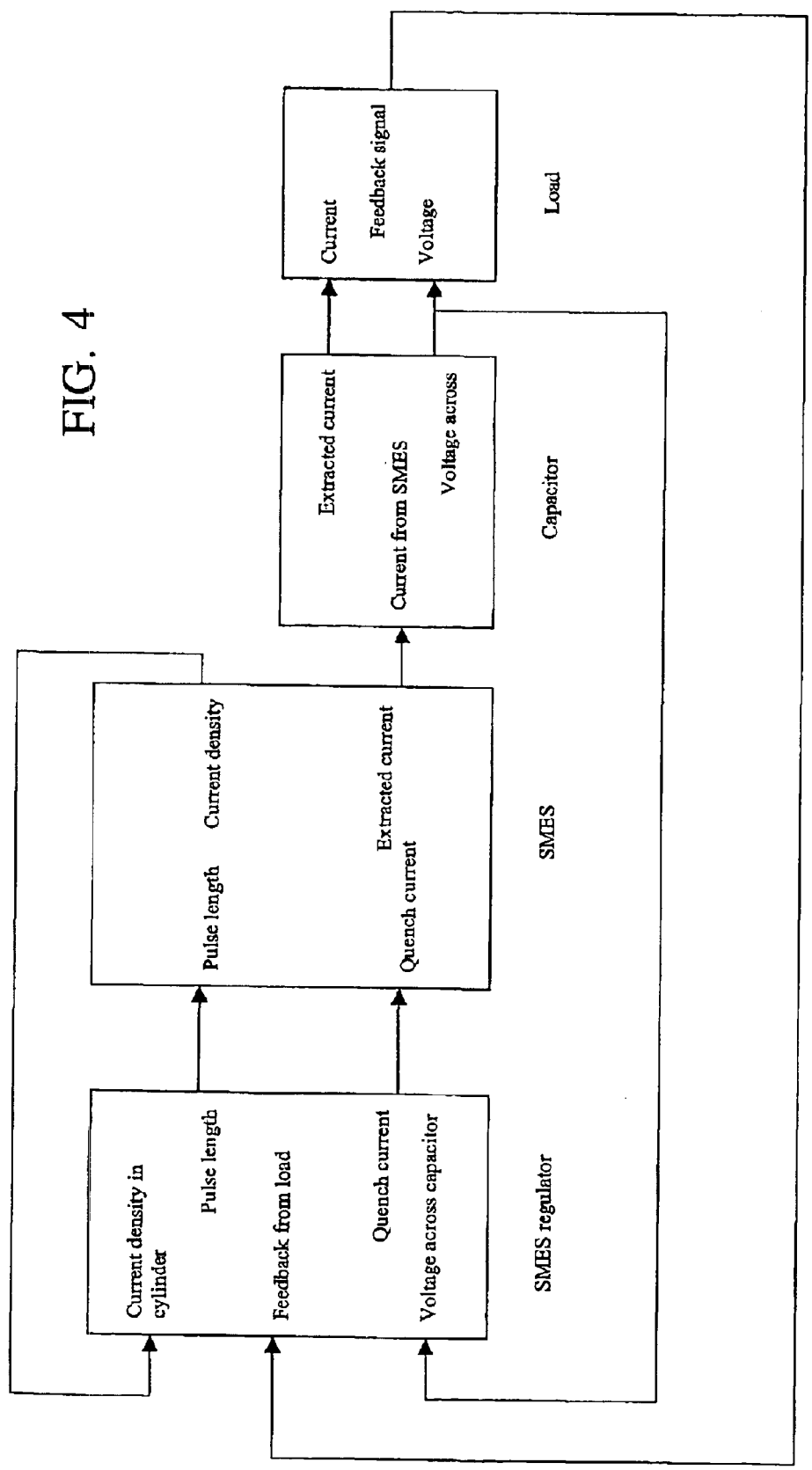

MAGNETIC ENERGY STORAGE DEVICE

TECHNICAL FIELD

This invention relates to a superconducting magnetic energy storage (SMES) device of the kind comprising a closed first coil means made of superconducting material, cooling means for cooling the first coil to superconducting temperatures, second coil means inductively coupled to the first coil means for inputting energy to, and/or outputting energy from the first coil means, and switching means for switching the first coil means between a superconducting condition and a non-superconducting condition. Although the invention primarily relates to a SMES device in which the first coil means comprises a high-transition temperature superconducting (HTS) material it also relates to a SMES device in which the first coil means comprises a low-transition temperature superconducting (LTS) material. The invention also relates to a method of inputting and outputting energy to and from a network and to a network protection system.

The invention has application in maintaining power quality against short term power or voltage reductions, in serving as a storage system in order to smooth peak loads, in providing an "uninterruptible" power supply in a grid or even in a supply system for an industrial process where power disturbances are very expensive and damaging, such as, for example, a paper mill or a steel mill. The invention may also have application as an energy storage device in vehicles, including ships, aeroplanes and other types of vehicles such as electric and hybrid electric/combustion powered cars, trucks and buses.

BACKGROUND OF THE INVENTION

In a SMES device, energy in form of a magnetic field can be stored in a coil made of superconducting material where a superconducting current circulates. The stored energy is $\frac{1}{2}.L.I^2$ where L is the inductance and I is the current circulating in the coil. Since the coil is superconducting, very small losses are present and the storage time is very long. When energy is required, the current can be redirected and the energy stored in the coil is transferred to work in the coil. Most, if not all, of the present day solutions for charging and discharging a SMES are based on redirecting the current into or out of the coil using switches. Generally the switches are mechanical or solid state or a combination of both and can either be placed in the cooling medium that cools the superconducting coil or placed outside the cooling medium, e.g. at room temperature. However, in both cases, the redirection of the current is based on the principle of breaking the superconducting circuit to force the current to flow in a path through the load. In particular, in such known devices, current leads are present between the cooled superconducting coil and the outside in order to input energy to, or output energy from, the superconducting coil in the form of an electrical current.

The design of such feed-through current-carrying leads is one of the main difficulties when constructing a SMES device. At some point of the feed-through there must be a change from a superconducting conductor to a good room-temperature electrical conductor. However, a good electrical conductor is generally also a very good heat conductor, which makes the thermal isolation of the cold space difficult.

Another drawback with using conventional switches is that the switches always exhibit resistive losses since it is practically impossible to construct a purely superconducting switch. Therefore, conventional SMES devices will suffer from losses even in stand-by mode, which is a serious drawback for long time storage devices.

It is of course known to transfer energy between coils using induction. For example this concept is used with transformers. However, inductive energy transfer is only possible with time varying currents. In both U.S. Pat. No. 4,939,444 and U.S. Pat. No. 5,682,304, SMES apparatuses are disclosed in which coils are inductively coupled together. These known apparatus use oscillation circuits to create oscillating currents. The authors of these known specifications have correctly realised that the superconducting properties of a coil are destroyed if the magnetic field is too high. They refer to the possibility of storing a large amount of energy in the coil since the magnetic field will destroy its superconducting properties. The solution to the problem suggested by these authors is to wind a pair of coils in opposite directions in order to cancel out the magnetic field. However, it is claimed that, since the magnetic field is cancelled out, the current flowing in the superconducting coil arrangement can be increased substantially. It is believed, however, that such a coil arrangement will not store any energy although the current can be increased. This is because the energy is "in" the magnetic field itself. With no magnetic field no magnetic energy is present.

U.S. Pat. No. 5,682,304 does disclose a number of inductive couplings between the coils. However, the couplings between coils 9 and 12 and between coils 22 and 24 are only present in order to cancel out the magnetic field. Moreover, in order to achieve an oscillating circuit formed by components 30 and 33, the coupling factor between coil 36 and coil 30 must not be too good. With perfect coupling the inductance in the LC-circuit is zero. However, with a coupling factor less than unity an energy transfer may be possible since the leak inductance is larger than zero, although this is not what is described.

One aim of the present invention is to provide an improved SMES device of the kind referred to in which there are no mechanical connections connected to the superconducting first coil means for inputting energy to and/or outputting energy from the first coil means.

Another aim of the present invention is to enable energy to be inputted to or partially extracted from stored energy of superconducting coil means.

According to one aspect of the present invention there is provided a superconducting magnetic energy storage (SMES) device comprising a first coil means made of superconducting material, cooling means for cooling the first coil to superconducting temperatures, second coil means inductively coupled to the first coil means for inputting energy to, and/or outputting energy from the first coil means, and switching means for switching the first coil means between a superconducting condition and a non-superconducting condition, characterised in that the first coil means is arranged as a closed loop electric circuit having no connecting means mechanically connected thereto for inputting or outputting energy thereto, and in that the switching means comprises a third coil means for the application or removal of a magnetic field for switching the first coil means between its non-superconducting and superconducting conditions.

The invention is based on the concept of transferring energy between the superconducting (cryogenic) first coil means to the normally conducting second coil means at an elevated (relative to cryogenic) temperature, e.g. at room temperature, without using an oscillating circuit. The required time varying current is for inductively transferring energy is obtained by making the superconducting material of the first coil means normal-conducting with a large enough magnetic field from a the third coil means, preferably arranged perpendicular to the other two coil means. As long as this quench-field is applied the current in the first coil means decays. According to Faraday's law of induction the second coil means tries to oppose this change by inducing a current in the same direction. This current is used to provide a load with power. In practice a capacitor is charged to a desired voltage which, in turn, is discharged in a controlled way over a load. (If the load requires an ac-current there must be a dc-ac converter between the capacitor and the load.)

The present invention is based on experimental results proving that it is possible to partially or completely discharge a closed-loop superconductor in the manner described above. This opens the possibilities to isolate the cryogenic parts from the parts that can or must be at an elevated temperature, e.g. at room temperature, in a SMES application. The main consequence of this is that the heat leakage into the cryogenic parts can be minimised. Furthermore, a bulk cylinder of the superconducting material can be used as a one-turn first coil means. Since the first coil does not have switches or other components physically attached to it, the resistive losses are minimised.

Although not essential, it is preferred that the first coil means comprises a single turn, e.g. in the form of a cylinder. Alternatively, for example, the first coil means may be of other shapes, e.g. of toroidal form.

Preferably the switching means further comprises control means for controlling the current supplied to the third coil means. In this way the amount of quenching of the superconducting first coil means can be controlled. Suitably, the control means comprises a current pulse generator for applying control current pulses to the third coil means. Conveniently the pulse generator is able to control the amplitude and/or duration of the pulses to control the magnetic field applied by the third coil means.

Conveniently the first coil means can be made of any kind (high or low-temperature SC) and of any form (wires, bulk) of superconducting material. Preferably, however, the first coil means is made of a bulk ceramic high-temperature superconducting material, such as YBCO or BSCCO, preferably arranged in a single turn. Preferably the superconducting material should be anisotropic such that the maximum allowed current in the direction of the axis (the "c-axis") of the first coil means is much less than the critical current in the plane (the "a-b plane") perpendicular to the c-axis. The reason for this is that it is necessary to make the superconducting first coil means normally conducting (i.e. non-superconducting) in order to charge and discharge the SMES. This is achieved by applying a field-pulse in the a-b plane which is sufficiently large such that the superconducting material is transferred to its normal conducting state. The more anisotropic the superconducting material is the smaller amplitude of the pulse that is required.

Suitably the cooling means comprises a cryogenic container, e.g. a dewar, in which the first coil means is situated. The second coil means is preferably arranged outside the cryogenic container. By suitable shaping of the cryogenic container, the third coil means may also be situated outside the cryogenic container. For example, in the case of the first coil means being in the form of a cylinder, the cryogenic container may have an annular form with the third coil means surrounding a part of the annular cryogenic container.

Preferably the third coil means is arranged to supply a magnetic field in a plane substantially perpendicular to the main (cylindrical) axis of the first coil means.

Preferably the first and second coils are coaxial with each other.

According to another aspect of the present invention there is provided a method of inputting energy to and/or outputting energy from a first coil means made of superconducting material and cooled to superconducting temperatures, comprising inductively coupling second coil means to the first coil means, wherein the first coil means is arranged in a closed electrical circuit with no mechanical connections thereto for inputting or outputting energy to the first coil means and wherein the first coil means is rendered non-superconducting or superconducting by the application or removal of a magnetic field via a third coil means.

Preferably the magnitude of the magnetic field applied by the third coil means is controllable. By applying a controllable current, e.g. via current pulse control, the first coil means can be partially quenched so that energy can be partially extracted from or supplied to the first coil means.

According to a still further aspect of the present invention there is provided a power supply system including a magnetic energy storage device according to said one aspect of the present invention. The power supply system may be able to provide energy storage, power quality, peak load security and/or power supply security. Power quality, peak loads and power supply security may be specified closely and numerically in typical contracts for delivery and maintenance of electrical power by a power supply system.

DESCRIPTION OF THE DRAWINGS

Embodiments of the invention will now be described, by way of example only, with particular reference to the accompanying drawings, in which:

FIG. 4 is a block diagram of a power supply system according to the invention.

DESCRIPTION OF THE EMBODIMENTS

Figure 1:
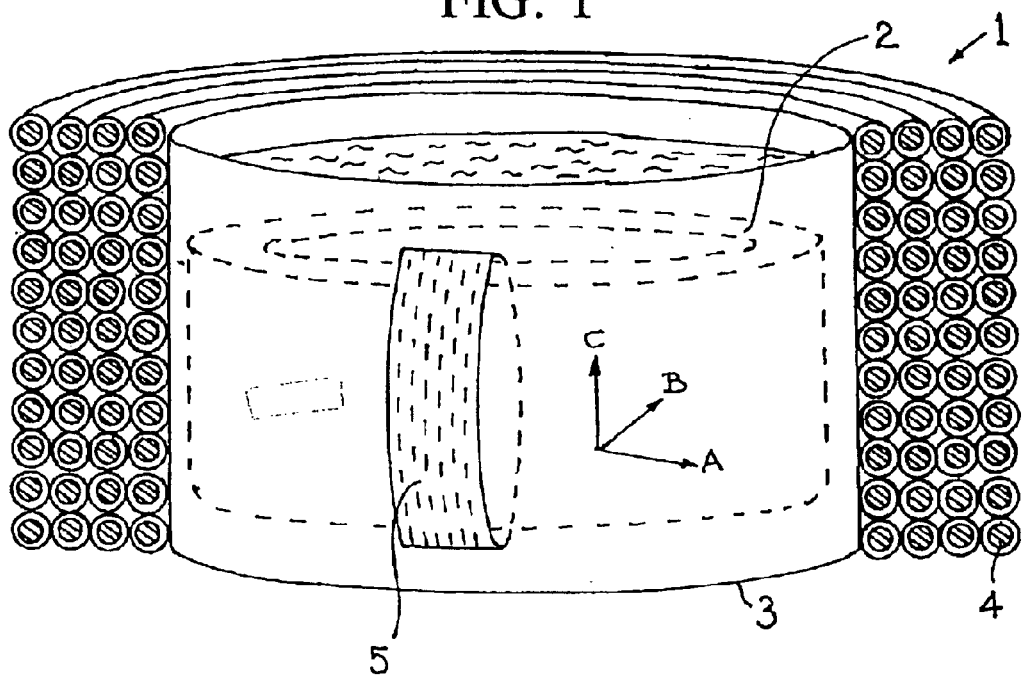
FIG. 1 is a schematic partly sectioned perspective view of one embodiment of a SMES device according to the invention.

FIG. 1 shows one embodiment of a SMES according to the invention and generally designated by the reference numeral 1. The SMES 1 comprises a one turn first coil in the form of a cylinder 2 and made of superconducting material, such as YBCO having a $T_c$=92 K. The cylinder 2 forms a closed electric circuit and has no mechanical or physical connections connected thereto for supplying energy to or extracting energy from the coil. The cylinder 2 is cooled to superconducting temperatures by cryogenic cooling means. In the embodiment shown, the cylinder 2 is received in a container 3, e.g. a conventional dewar, containing liquid nitrogen at a temperature of 77 K. Alternatively a suitable enclosure means for containment and circulation of helium (or other coolant) in a gas, liquid or gas/liquid mixture may be used. Cooling down to between 40 K and 20 K or less in this manner provides a higher magnetic flux density in high temperature superconductors such as YBCO or BSCCO.

A second coil 4 for outputting stored energy from the cylinder 2 is wound outside the container 3, is coaxial with the cylinder 2 (in the direction of the c-axis (see FIG. 1) and is inductively coupled with the cylinder 2. A load (not shown) is connected to the coil 4. In practice the coaxially arranged coil 4 is also used for inputting energy to the superconducting cylinder 2.

A third coil 5 is wound around the cylinder 2 or a portion thereof. As shown the coil 5 is positioned inside the container 3 but, in practice, the container 3 would be suitably shaped, e.g. in the form of an annular trough or the like, to enable the coil to be wound around the container 2 and to be positioned outside the container 3. Current control means (not shown) are provided for supplying current pulses to the third coil 5.

In use energy in the form of magnetic field is stored in the superconducting cylinder 2. Energy is extracted by crossing the known conducting-to-superconducting phase transition line, which is a function of H (magnetic H field) and j (current density) for a given temperature for the superconducting material. For an anisotropic superconducting material these values depend on the direction of the applied field or current. In practice, the superconducting material is made to go normal (i.e. non-superconducting) by applying a magnetic field in the a-b plane (see FIG. 1). The energy stored in the system starts to dissipate in the load resistance connected to the coil 4.

Figure 2:
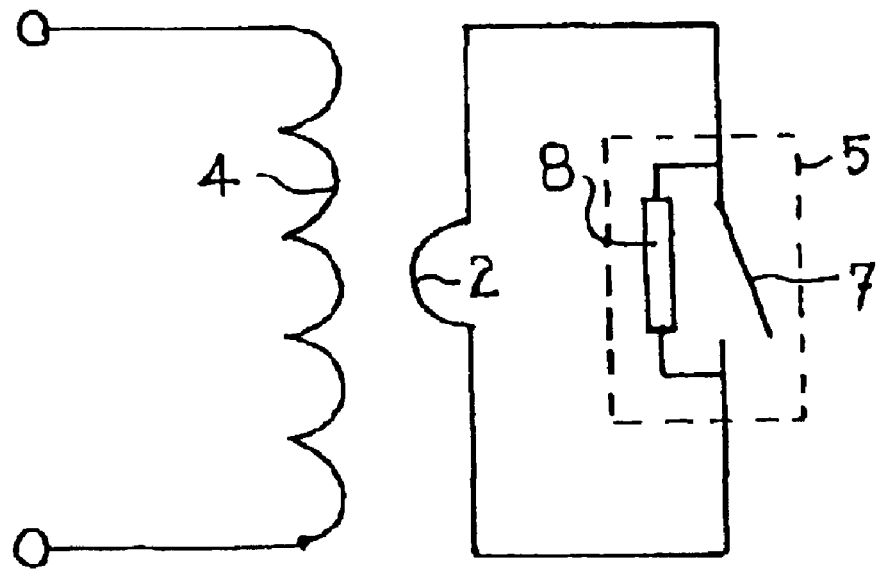
FIG. 2 is a schematic circuit diagram illustrating the principle of operation of the SMES of FIG. 1.

The operation of the SMES device 1 is illustrated schematically in FIG. 2. The one-turn coil in the form of cylinder 2 is arranged in a closed circuit. The "switching" function of the third coil 5 is illustrated symbolically in FIG. 2. In particular, when the superconducting material of the cylinder 2 is superconducting, switch 7 can be considered closed. When current is applied to the coil 5, however, and a magnetic field is applied in the a-b plane, the superconducting material is rendered normal or non-superconducting. In this case, the switch 7 can be considered open so that resistance 8 is introduced into the circuit. As mentioned above, this is only a symbolic representation, FIG. 2 showing an equivalent circuit for the quenching coil 5.

The coil 5 acts as a means for controllably quenching the superconducting material of the cylinder 2 for switching the superconducting material between its superconducting and non-superconducting states. The preferred method of controlling the current supplied to the coil 5, and thus controlling the switching of the superconducting material, is to use a current pulse generator (not shown). Characteristics of the current pulses, e.g. amplitude and/or length of the current pulses, pulse rise time, aggregate current value, pulse decay time, can be controlled to provide the desired degree of quenching. In this manner it is possible to extract only a part of the energy stored, i.e. a phenomenon that can be referred to as "partial quenching". A well-chosen combination of amplitude and pulse length can release a desired amount of energy.

As mentioned above charging of the SMES device 1 can be achieved in a manner that in principle is the reverse to the procedure described above for extraction of energy. In this case, energy may be supplied to the cylinder 2 via the induction from the coaxial coil 4. A current is applied to coil 5 that causes quenching of the coil 2 so rendering the latter normally conducting (as opposed to superconducting). When current is supplied through the coil 4, a current is induced in the cylinder 2 which is, however, limited and reduced by the electrical resistance 8 present. When the quenching current is removed from the coil 5, the cylinder 2 returns to its superconducting condition. The removal of current from the coil 4 induces a current in the superconducting coil 2. In an alternative method of charging the SMES device 1, a current is applied to the coil 4 inducing an opposing current in the cylinder 2. A quenching current is applied to the third coil 5 so that the current induced in the cylinder 2 dies away. Current continues to flow in coil 4. When the quenching current is removed from coil 5, the cylinder 2 becomes superconducting again. When the current is removed from the coil 4, a current is then induced in the cylinder 2.

Figure 2A:
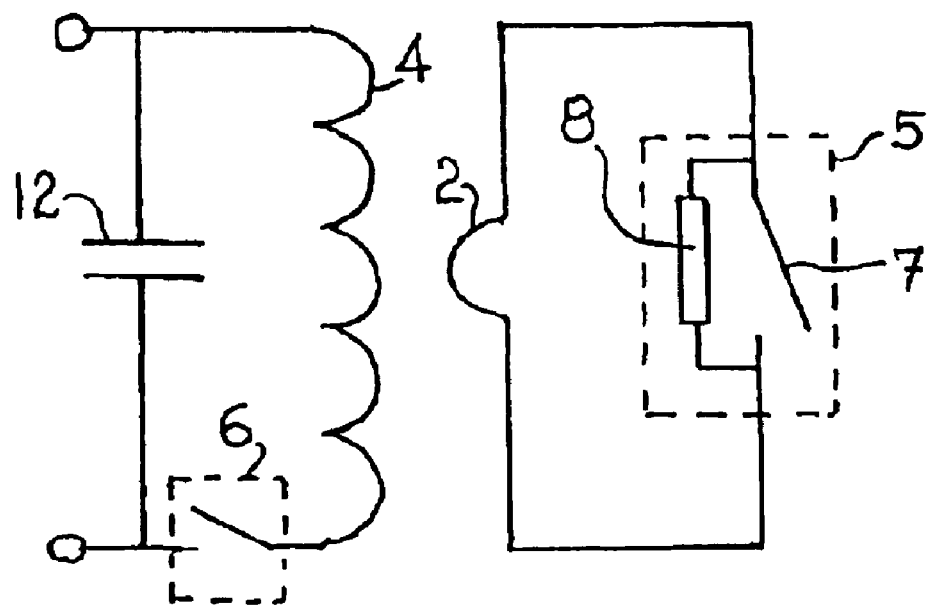
FIG. 2a is a modification of the schematic circuit diagram shown in FIG. 2.

The present invention makes use of the transfer of energy between a superconducting (cryogenic) first coil means to a normal conducting second coil means at elevated, e.g. room temperature, without the use of an oscillating circuit. The required time varying current is instead obtained by making the superconducting material normal-conducting with a large enough magnetic field from the third coil means perpendicular to the other two coil means. As long as this quench-field is applied the current in the first coil means decays. According to Faraday's law of induction the secondary coil tries to oppose this change by inducing a current in the same direction. This current is used to provide a load with power. In practice a capacitor 12 (see FIG. 2a) is charged to a desired voltage which, in turn, is discharged in a controlled way over a load. (If the load requires an ac-current there must be a dc-ac converter between the capacitor and the load.) Symbolic switch means 6 is used to direct current flow in the required direction. For extraction of energy, the switch means, e.g. diode means, prevents current from flowing back towards the coil 4. For injection of energy, the switch means is effectively closed.

The invention described herein makes it possible to partially or fully discharge (or charge) a closed-loop superconductor by inductive couplings. This opens the possibility to isolate the cryogenic parts from other parts of the device or system that can be at elevated, e.g. room temperature. Thus heat leakage into the cryogenic parts can be minimised. Furthermore, since no mechanical connections are made to the cylinder 2, resistive losses are minimised. The problem of the prior art with switching current from the superconducting coil to a normal conducting circuit is avoided by having no physical or mechanical contact between the systems. By partial quenching of the superconducting material, energy can be supplied to or extracted from the superconducting coil in a controlled manner.

Figure 3:
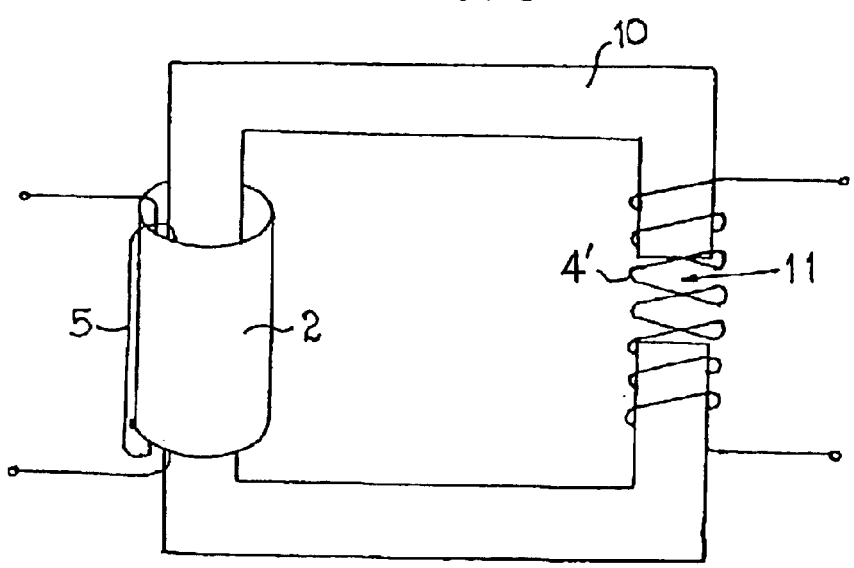
FIG. 3 is a schematic view of another embodiment of a SMES device according to the invention.

FIG. 3 illustrates another, presently less preferred embodiment of the invention in which a high permeability magnetic core 10 is provided having at least one air gap 11 for increasing the energy storage capacity. In this embodiment, a second coil 4' is not wound directly outside the superconducting first coil means or cylinder 2' but is instead wound on the core 10. The coil 4' is preferably situated around the air-gap(s) 11 in the core.

It is possible to connect a capacitor to the discharge circuit which makes it possible to distribute the energy in a more controlled manner. The energy is stored long-term in the superconducting cylinder of the SMES and, when needed, it is extracted little by little. In this scenario the capacitor works as an intermediate storage device. An application would be to use it as an energy quality booster because of the short access time. This means that when a voltage drop is detected in the electricity net the SMES is quickly switched on to ensure a constant voltage level.

FIG. 4 illustrates a typical control system using a number of inputs. The control information may include actual current density in the cylinder, actual voltage across the capacitor, a feedback signal from the load, and the actuators would be the pulse length and the quench current in the pulse generator.

Although the superconducting coil (cylinder 2) is preferably of cylindrical form, it may take other forms providing a closed electrical circuit and being of a fixed shape. The superconducting material, e.g. ceramic material, may, for example, be pressed and sintered into a desired shape, such as a toroidal shape, which is not plastically deformable.

The use of a power supply device according to the invention enables a power supply system of a specified electrical power quality or power load to be provided. By using a SMES device an economic advantage can be obtained since more stringent power quality/load matching specifications can be achieved without the use of additional generators, reactors, etc.. The invention has application in maintaining power quality against short term power or voltage reductions, in serving as a storage system in order to smooth peak loads, in providing an "uninterruptible" power supply in a grid or even in a supply system for an industrial process where power disturbances are very expensive and damaging, such as, for example, a paper mill or a steel mill. A power supply system according to the invention may also have application as an energy storage device in vehicles, including ships, aeroplanes and other types of vehicles such as electric and hybrid electric/combustion powered cars, trucks and buses.

What is claimed is:

1. A superconducting magnetic energy storage (SMES) device comprising:
    first coil means made of superconducting material;
    cooling means for cooling the first coil means to superconducting temperatures;
    second coil means inductively coupled to the first coil means for inputting energy to, and/or outputting energy from, the first coil means; and
    switching means for switching the first coil means between a superconducting condition and a non-superconducting condition,
    wherein the first coil means is arranged as a closed loop electric circuit having no connecting means mechanically connected thereto for inputting or outputting energy thereto, and wherein the switching means comprises third coil means for application or removal of a magnetic field for switching the first coil means between its non-superconducting and superconducting conditions.

2. A SMES device according to claim 1, wherein the first coil means comprises a single turn.

3. A SMES device according to claim 2, wherein the first coil means comprises a cylinder.

4. A SMES device according to claim 2, wherein the first coil means is of toroidal form.

5. A SMES device according to claim 3, wherein the first coil means comprises ceramic material and has a fixed shape which is not plastically deformable.

6. A SMES device according to claim 1, wherein the switching means further comprises control means for controlling the current supplied to the third coil means.

7. A SMES device according to claim 6, wherein the control means comprises a current pulse generator for applying control current pulses to the third coil means.

8. A SMES device according to claim 7, wherein the pulse generator has means for controlling amplitude and/or duration of the pulses to control the magnetic field applied by the third coil means.

9. A SMES device according to claim 1, wherein the first coil means comprises high temperature superconducting material.

10. A SMES device according to claim 1, wherein the first coil means comprises low temperature superconducting material.

11. A SMES device according to claim 1, wherein the superconducting material is anisotropic.

12. A SMES device according to claim 1, wherein the cooling means comprises a cryogenic container, in which the first coil means is situated.

13. A SMES device according to claim 12, wherein the second coil means is arranged outside the cryogenic container.

14. A SMES device according to claim 12, wherein the third coil means is situated outside the cryogenic container.

15. A SMES device according to claim 1, wherein the third coil means is arranged to supply a magnetic field in a plane substantially perpendicular to a cylindrical axis of the first coil means.

16. A SMES device according to claim 1, wherein the first and second coils are coaxial with each other.

17. A power supply system including a magnetic energy storage device according to claim 1.

18. A method of inputting energy to and/or outputting energy from first coil means made of superconducting material and cooled to superconducting temperatures, comprising:
    inductively coupling second coil means to the first coil means,
    wherein the first coil means is arranged in a closed electrical circuit with no mechanical connections thereto for inputting or outputting energy to the first coil means, and wherein the first coil means is rendered non-superconducting or superconducting by application or removal of a magnetic field by third coil means.

19. A method according to claim 18, wherein a magnitude of the magnetic field applied by the third coil mean is controllable.

20. A method according to claim 18, wherein a duration of the magnetic field applied by the third coil means is controllable.

21. A method according to claim 18, wherein the magnetic field applied by the third coil means is pulsed and a pulse length of the applied magnetic field is controlled.

22. A method according to claim 19, wherein a field applied by the third coil means is controlled by applying controlled current pulses to the third coil means.

23. A method according to claim 19, wherein characteristics of the current pulses are controlled.

* * * * *